(12) United States Patent
Sever

(10) Patent No.: US 11,667,187 B2
(45) Date of Patent: Jun. 6, 2023

(54) FRACKING SENSOR PROBE

(71) Applicant: John Sever, Villa Ridge, MO (US)

(72) Inventor: John Sever, Villa Ridge, MO (US)

(73) Assignee: HUSKY CORPORATION, Pacific, MO (US)

( * ) Notice: Subject to any disclaimer, the term of this patent is extended or adjusted under 35 U.S.C. 154(b) by 167 days.

(21) Appl. No.: 16/974,388

(22) Filed: Jan. 6, 2021

(65) Prior Publication Data

US 2021/0213827 A1     Jul. 15, 2021

Related U.S. Application Data

(60) Provisional application No. 62/995,069, filed on Jan. 10, 2020.

(51) Int. Cl.
| | | |
|---|---|---|
| *B60K 15/03* | (2006.01) | |
| *G01F 23/30* | (2006.01) | |
| *G01F 23/60* | (2006.01) | |
| *B60K 15/077* | (2006.01) | |

(52) U.S. Cl.
CPC ...... *B60K 15/03006* (2013.01); *B60K 15/077* (2013.01); *G01F 23/30* (2013.01); *G01F 23/60* (2013.01); *B60K 2015/03019* (2013.01); *B60K 2015/0319* (2013.01); *B60K 2015/03026* (2013.01); *B60K 2015/03131* (2013.01); *B60K 2015/03144* (2013.01); *B60K 2015/03223* (2013.01)

(58) Field of Classification Search
CPC .............. G01F 23/30; G01F 23/60; B60K 2015/03019; B60K 2015/0321; B60K 2015/03217; B60K 2015/03223
See application file for complete search history.

(56) References Cited

U.S. PATENT DOCUMENTS

| | | | | |
|---|---|---|---|---|
| 4,388,253 A | * | 6/1983 | Maxwell | F02M 17/16 261/88 |
| 4,724,705 A | * | 2/1988 | Harris | G01F 23/68 338/33 |
| 4,928,525 A | | 5/1990 | Aderholt et al. | |
| 5,319,545 A | | 6/1994 | McGarvey et al. | |

(Continued)

FOREIGN PATENT DOCUMENTS

| | | |
|---|---|---|
| EP | 2 587 242 B1 | 9/2015 |
| JP | H08219852 A * | 2/1995 |

(Continued)

*Primary Examiner* — Erick R Solis
(74) *Attorney, Agent, or Firm* — Sandberg Phoenix von Gontard PC

(57) ABSTRACT

This invention is a sensor probe, generally used in the oil fracking business, and includes structurally a pair of tube members, concentrically assembled, an inner housing tube, and an outer spout tube, affixed to a cap and adaptor, with the inner housing holding one or more sensors, to detect the level of fuel within the fuel tank of the fracking truck. The adaptor has a first aperture for attachment of the fuel line, for delivery of fuel in the space between the tube members, and the adaptor has a second aperture for connection of an electrical receptacle, for attachment with the electric lines leading from the various sensors, to the adaptor, for connection with a circuit line from a remote monitor.

20 Claims, 4 Drawing Sheets

(56) References Cited

U.S. PATENT DOCUMENTS

| | | |
|---|---|---|
| D350,297 S | 9/1994 | Weisel |
| 6,397,668 B1 | 6/2002 | Davison et al. |
| 8,629,778 B2 | 1/2014 | Burrow |
| 8,928,473 B2 | 1/2015 | Gilchrist et al. |
| 9,114,753 B2 | 8/2015 | Raniere |
| 9,346,662 B2 | 5/2016 | Van Vliet et al. |
| 9,586,805 B1 | 3/2017 | Shock |
| 9,610,955 B2 | 4/2017 | Palmer et al. |
| 9,790,080 B1 | 10/2017 | Shock |
| 9,815,683 B1 | 11/2017 | Kalala et al. |
| 9,874,470 B2 | 1/2018 | McBride et al. |
| 9,884,596 B2 | 2/2018 | Raniere |
| 9,932,220 B1 | 4/2018 | Shock |
| 9,981,840 B2 | 5/2018 | Shock |
| 10,029,906 B2 | 7/2018 | Van Vliet et al. |
| 10,101,191 B2 | 10/2018 | McBride et al. |
| 10,150,662 B1 | 12/2018 | Shock |
| 10,187,065 B2 | 1/2019 | Kerman |
| 10,196,258 B2 | 2/2019 | Kalala et al. |
| 10,197,428 B2 | 2/2019 | McBride et al. |
| 10,247,589 B2 | 4/2019 | Fuller et al. |
| 10,267,665 B2 | 4/2019 | McBride et al. |
| 10,289,126 B2 | 5/2019 | Shock |
| 10,303,190 B2 | 5/2019 | Shock |
| 10,466,030 B2 | 11/2019 | Gurley et al. |
| 2007/0210528 A1* | 9/2007 | Baber .................... F16J 15/104 |
| | | 277/549 |
| 2008/0314674 A1* | 12/2008 | Kamio .................... B63B 39/14 |
| | | 180/282 |
| 2009/0107872 A1* | 4/2009 | Sakakibara ........ F02M 37/0017 |
| | | 206/524.1 |
| 2011/0301884 A1 | 12/2011 | Denby et al. |
| 2018/0306151 A1* | 10/2018 | Laepple ................ F02M 59/466 |

FOREIGN PATENT DOCUMENTS

| | | | | |
|---|---|---|---|---|
| WO | WO-0235188 A2 * | 5/2002 | ........... | G01J 23/268 |
| WO | WO-2014167471 A1 * | 10/2014 | ............. | G01F 23/30 |

* cited by examiner

FRACKING SENSOR PROBE

CROSS-REFERENCE TO RELATED APPLICATION

This is a nonprovisional patent application that claims priority to the provisional patent application having Ser. No. 62/995,069, filed on Jan. 10, 2020;

FIELD OF THE INVENTION

This invention relates to a sensor probe, predominantly used for maintaining fuel levels within the fuel tank of a fracking truck, and is designed to provide for continuous supply of diesel or other fuel to the fracking equipment, and preventing the detrimental and expensive shut off of such equipment due to lack of fuel supply to the fracking truck, and its associated equipment used in the fracking operation. The inventor relates to a fracking sensor probe that relies upon the continuous supply and delivery of fuel to the fracking service buck, during its usage and application.

BACKGROUND OF THE INVENTION

A large variety of equipment has long been available in the fuel supply industry, and which includes various types of probes, sensors, and level gauges, that provide an indication, determination, and supply of fuel to equipment that may be used for a variety of purposes, whether it be for fuel delivery to a vehicle, or an indicator as to the level of fuel contained in a fuel tank, of the fuel servicing truck.

An example of such equipment can be seen in various United States patents or publications relating to this type of technology. For example, the published application to Denvy, et al, No. US2011/0301884, shows a storage tank monitoring apparatus.

U.S. Pat. No. 4,928,525, shows a sonic type of tank inventory control system and method.

A design patent to Weisel, No. DES. 350,297, shows a fluid sensor mounting track.

A patent to Fuller, et al, Ser. No. 10,247,589, shows a fluid level monitor.

U.S. patent to McBride, Ser. No. 10/267,665, discloses a fuel tank level monitoring system.

Of importance, is U.S. Pat. No. 9,884,596, to Raniere, which is an apparatus and method for preventing a vehicle from running out of fuel.

U.S. Pat. No. 9,610,955, to Palmer, et al, discloses a vehicle fuel consumption monitor and feedback systems.

U.S. Pat. No. 9,114,752, discloses an apparatus and method for preventing a vehicle from running out of fuel.

U.S. Pat. No. 8,928,473, to Gilchrist, et al, shows a fuel monitoring apparatus and method.

U.S. Pat. No. 6,397,668, to Davison, et al, shows a fuel level monitor.

With regard to fuel delivery, U.S. Pat. No. 5,319,545, shows a system to monitor multiple fuel dispensers and fuel supply tank.

With respect to the fueling of fracking equipment, used in the oil exploration business, U.S. Pat. No. 10,196,258, to Kalala, shows a method and system for mobile distribution stations.

U.S. Pat. No. 9,932,220, to Shock, shows a mobile distribution station with aisle walkway.

U.S. Pat. No. 10,029,906, discloses a fuel delivery system and method.

U.S. Pat. No. 9,346,662, shows a related delivery system for fuel, for maintaining a level of fuel within a pair of fuel tanks. These patents generally relate to distribution stations, for fueling, and include a plurality of hoses, connecting with the manifold, with a plurality of valves on the mobile trailer, and containing a plurality of guided wave radar level sensors, apparently for sensing the amount of fuel within the fuel tanks.

This provides an analysis of the patents known to the Applicant, relating to fueling stations.

SUMMARY OF THE INVENTION

As has been established in the art, and particularly of current practice in the United States, with regard to the extraction of oil and fuel from underground, the process of fracking has become quite prevalent, at least in the United States, and has generated a substantially enhanced quantity of oil from subterranean locales, to the extent that this Country has now become rather energy independent. Generally, fracking, as it is called, or hydraulic fracturing, is the process in which oil and gas companies drill into the ground to extract natural gas and residue oil from shale rock, that may locate thousands of feet underground, in the various rock formations. In the previous drilling for oil, the drilling companies would drill to the site of pockets of substantial potential fuel, and simply pump, or under the pressure of the embedded oil, bring it to the surface for collection and further processing. But, such activity has gone on for at least one hundred years, and much of the residue oil that remains within the shale rock had just been left intact. Now, it has been found that this residue of oil and natural gas within the shale rock can also be removed, and that there is an abundance of such supply of oil subterranean, that can now be brought to the surface by other and further processing. For example, as generally known, once the oil company has drilled down to the depth of the formation, and may undertake additional procedures such as horizontal drilling technology, which exposes more of the shale, once that formation is reached, gallons of water, sand, and an extensive list of man made chemicals are injected into the well under high pressure. This combination inserted in the well will fracture the rock formation, further, and release the gas and oil for either its natural delivery to the surface or be elevated through the high pressure delivered to the formation, for collection and further processing. As is known, through such a drilling process, each well can require up to five to six million gallons of water, to reach the desired output, not to mention the variety of sand, other chemicals, and pressure that must be exerted upon such combination fluids, to bring that residue oil to the surface. Once that procedure beings, it really cannot be stopped, until the shale formation has been depleted of its resources. Thus, as can be understood, it is essential that once the fracking procedure is initiated, it must be sustained, and cannot be disrupted, as for example, by the equipment running out of fuel, during the operations.

Hence, the concept of this current invention is to assure that proper gauging is maintained, and that sensor probes are continuously applied, so as to measure and maintain a satisfactory amount of fuel within the fuel tank of the fracking truck, to assure that adequate supply of fuel is continuously delivered to the equipment, to complete a fracking operation, once it has been commenced.

Thus, the concept of this current invention is to provide a type of fracking sensor probe, that can assure the availability of fuel to the fracking truck and its equipment, during the entire operations.

The concept of this invention, being a refueling sensor probe, is for use in keeping the fuel tank of a fracking truck full, but, as can be understood, it could be generalized in usage for other applications, that require continuous supply of fuel to an operation. The invention consists of a pair of metallic tubes, preferably aluminum, that are assembled concentrically, one nested inside the other. They are joined by a machined fitting into which the upper end of each tube threads onto, individually, that fitting having two concentric sets of screw threads, for accommodating the securement of the concentric tubes individually thereto. The fitting is also joined to a standard cam lock cap, concentric to both tubes, and suitable for attaching to the inlet of a standard diesel fuel tank, of the type as found on a fracking truck. The top of the fitting has two openings. The first of these allow fuel to pass through the fitting and into the space between the two concentric tubes, which forms a spout or flow path into the diesel tank as when the cam lock is attached to that tank. The centermost tube houses two or three float switch assemblies, with wires being routed from each, up to the inner tube and out through the second opening in the top of the fitting. From there, the wires can be attached to an extension style of electric cord that will feed a signal back to a tank controlling unit, that thereby monitors the fuel level inside the diesel tank, and can, based upon the signals received when the float switch is tripped on and off, open or closed, to open or close a valve that supplies or cuts off the supply of fuel to the tank of the fracking truck, as needed to keep the tank full, but not overflowing.

The aligned sensors within this inner tube may be the usual type of sensors that are capable of detecting a fluid, such as a reed type switch that can sense fluid when it is maintained at its operative level. These types of switches are generally known in the art as reed switches, and may be obtained from a company such as Gem Sensors, of Plainville, Conn. Hence, as can be understood, when there are a pair of such sensors provided within the probe, the upper sensor may detect when the fracking fuel tank is full and shuts off supply of further diesel fuel to the supply tank. When the lower switch detects an absence of diesel fuel, such can be detected, transmitted back to the tank controlling unit, and initiate the further supply of diesel fuel, to the fuel tank, in order to initiate its refilling. And, it is likely that there may include a third sensor switch located above both of these switches to provide an emergency or fail safe shut off of fuel in the event of a mechanical or electrical failure in the switch below. This is an example of the structure and functionality of the fracking sensor probe as developed herein.

It is, therefore, the principal object of this invention to provide a refueling sensor probe, designed for usage for keeping the fuel tank of a fracking truck full, and to detect the various levels of fuel remaining, so as to maintain the continuous operations of the fracking equipment, such as the generator that operates the compressor for developing the high pressure needed, so that such conditions are sustained throughout the entire fracking procedure, without any disruption, cessation or delay.

A further object of this invention is to provide a more automated sensing of the amount of fuel to be delivered to a fracking fuel truck, during its usage.

A further object of this invention is to provide a compact form of sensor, formed of a pair of concentric tubing, a center one that provides for sensing the level of fuel provided within the fuel tank, while the space between the pair of concentric tubes allows for the delivery of fuel to the fracking fuel tank, during its refilling.

These and other objects may become more apparent to those skilled in the art upon review of the Summary of the Invention as provided herein, and upon undertaking a study of the Description of its Preferred Embodiment, in view of the drawings.

DESCRIPTION OF THE PREFERRED EMBODIMENT

Figure 1:
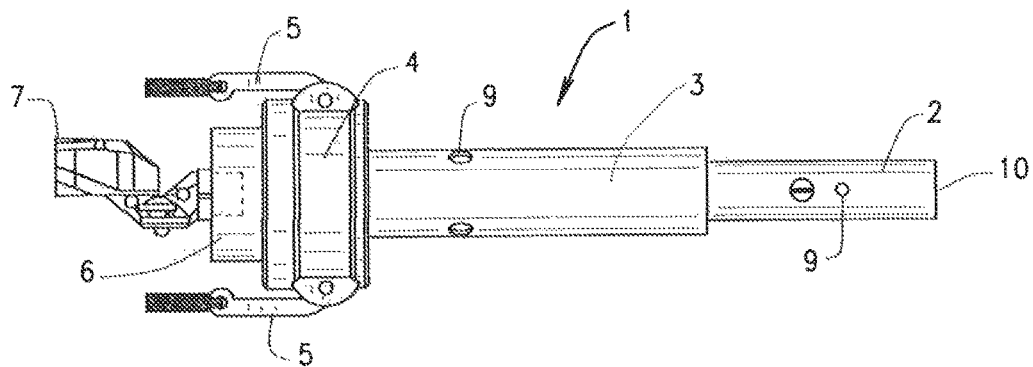
FIG. 1 shows the fracking sensor probe, and its cam lock mechanism, for application to the fuel tank of a fracking truck.

In referring to the drawings, FIG. 1 shows the fracking sensor probe I of this invention. As noted, it can be seen that the probe includes an inner housing 2 which is normally of tubular design, and it fits within an outer housing 3 and is concentrically arranged therewith, as can be noted. The probe includes a cap number 4, and as can be seen, it includes a cam locking mechanism 5 that is useful for holding the probe to the inlet of the fuel tank of a fracking truck, when it is installed for delivery of fuel, usually diesel fuel, to the fuel tank of said type of truck. The various tubular members 2 and 3 connect either to the cap 4, or to an adaptor 6, which will be subsequently described. The adaptor includes an inlet that is provided for threadedly engaging, in this instance, with a swivel 7, although it is just as likely that the fuel line, leading from the fuel tank, could connect directly to the adaptor 6, during its installation.

Figure 2:
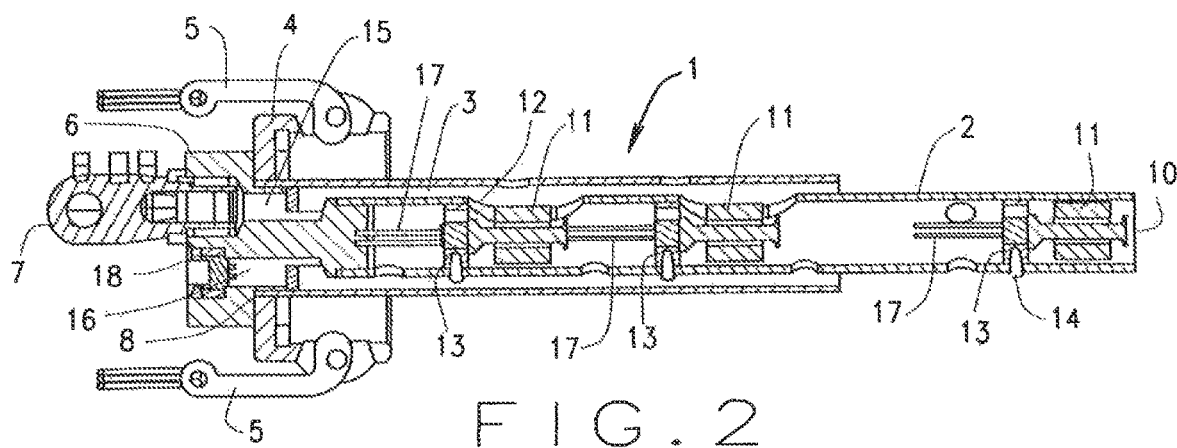
FIG. 2 is a longitudinal sectional view of the fracking sensor probe of FIG. 1.
Figure 3:
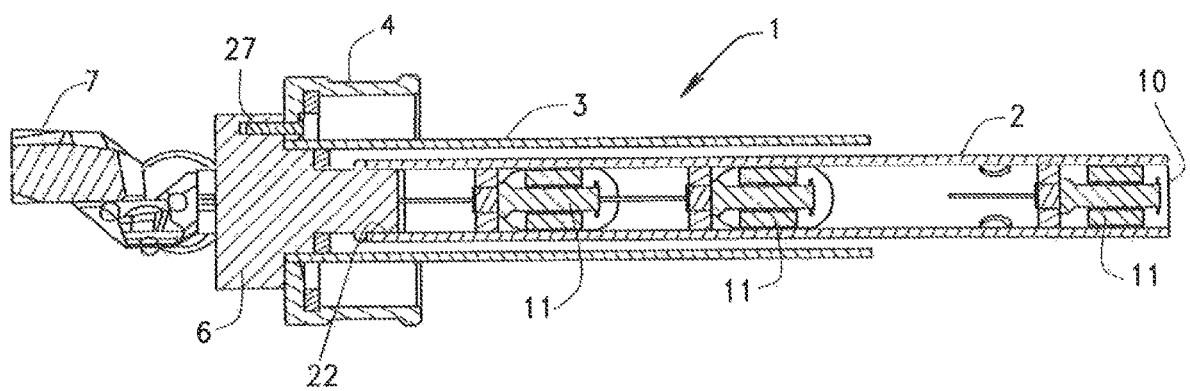
FIG. 3 is a longitudinal sectional view, of the fracking sensor probe, at a quarter turn position.

FIGS. 2 and 3 show a little more detail relating to the internal structure of the fracking sensor probe 1 of this invention. The cap 4 may be secured by the clamping mechanism 5 to a common full tank fillneck by a common camlock fit. The outer spout 3 may engage threadedly to the adaptor 6 in the region of its location 8 as can be noted. The cap 4 may engage with the adaptor 6 via a number of screws 27, an example of which can be noted.

The two tubular members, comprising the inner housing 2 and the outer spout 3, as can be noted, also in FIG. 1, contain a series of apertures, as at 9, and usually, their bottom ends, as at 10, will also be open, so as to allow the fuel to attain access to the interior of the inner housing 2, and be exposed to the various sensors provided therein, as will be described.

As can be seen, the inner housing 2 has a series of sensors 11, with the outer surface of the sensors being exposed through the housing 10 by means of disclosure through its apertures 9, and the further clearance slots 12, as noted. The sensors may be any type of a switch means that can detect the presence of liquid, such as the fuel, or diesel fuel, so as to indicate and disclose the level of such fuel within the fracking truck fuel tank, to provide an indication as to when additional fuel must be added, in order to maintain a more full capacity within said fuel tank, in order to continuously sustain the operations of the fracking machinery, during its usage during performance of a fracking operation. As can be seen, there are bushing 13 also provided within the inner housing 2, and which limits the vertical movement of the sensors 11 thereto, and to provide for their spaced operations within the functional probe, for detecting fuel levels within the fracking truck fuel tank. These sensors may float upon the surface of the contained fuel so as to provide detection of fuel levels and a range of fuel within the fuel tank. These supporting bushings 13, as can be noted, are fixed into position by means of the fasteners 14, holding these bushings in place.

At the upper end of the inner housing 2, and the outer spout 3, is the adaptor 6, as previously explained. Provided through the adaptor is a first channel, as noted at 15, and this is the channel that leads to the spacing between the inner housing 10, and the outer spout 3, that delivers the fuel through the spout, and into the fuel tank, during its refueling. Connected with the fluid passageway 15 is the swivel 7, as previously identified, and to which the fuel line may connect, by threaded engagement, from the diesel fuel tank, during installation.

There is a second passageway 16 provided through the adaptor 6, and this passageway is provided for accommodating the passage of the electrical lines 17 from the various sensors, and electrical lines connected with an electrical receptacle or installation, as noted at 18, so that it can connect with the circuit lines leading from a remote monitor, that monitors the level of fuel, through the sensors, remaining in the fracking truck fuel tank, and can either automatically, or alert an operator, when additional fuel must be added to the fuel tank, in order to sustain the continuous operations of the fracking equipment, throughout its entire usage and application in performing a fracking operation.

Figure 4:
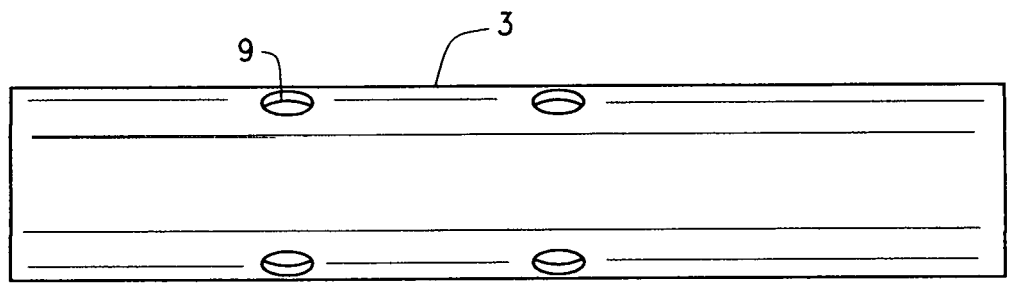
FIG. 4 is a side view of the outer tube form spout for the sensor probe.
Figure 5:
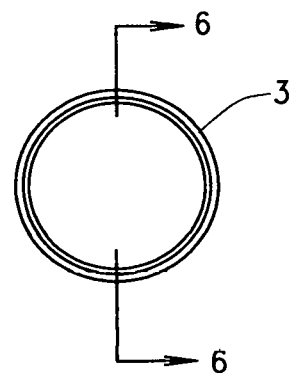
FIG. 5 is an end view of the fracking sensor probe of FIG. 4.
Figure 6:
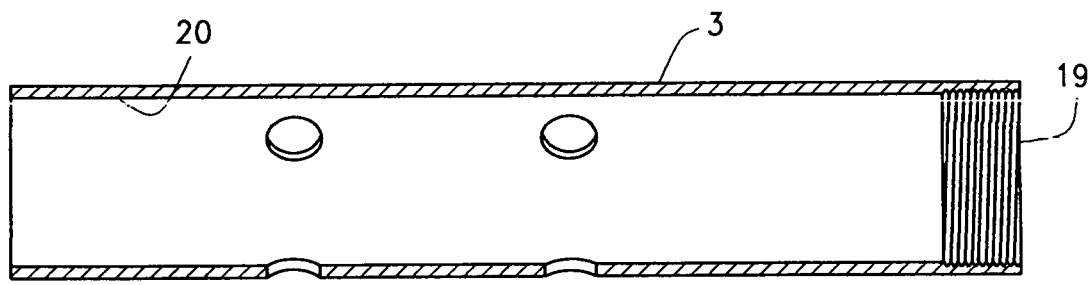
FIG. 6 is a longitudinal sectional view of the fracking probe taken upon the line 6-6 of FIG. 5.
Figure 7:
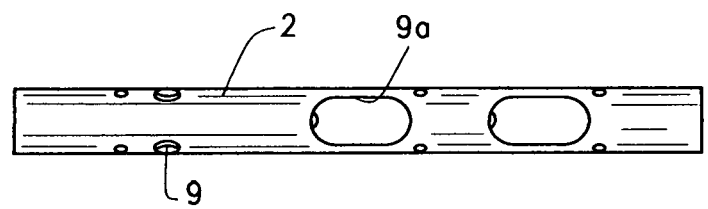
FIG. 7 is a longitudinal view of the inner tube of the fracking probe that mounts the various sensors for this invention.
Figure 8:
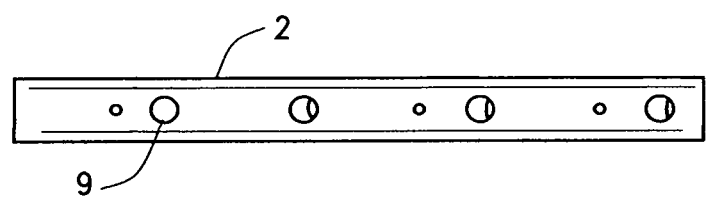
FIG. 8 is a longitudinal view of the inner tube at a quarter turn.
Figure 9:
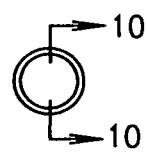
FIG. 9 is an upper end view of the inner tube of the fracking probe of FIG. 7.
Figure 10:
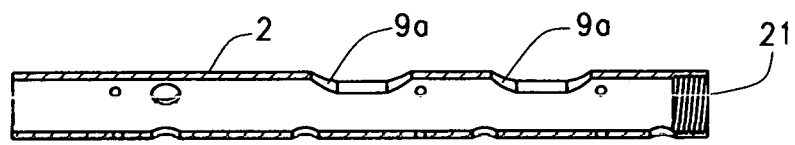
FIG. 10 is a longitudinal sectional view of the fracking probe taken along the line 10-10 of FIG. 9.
Figure 11:
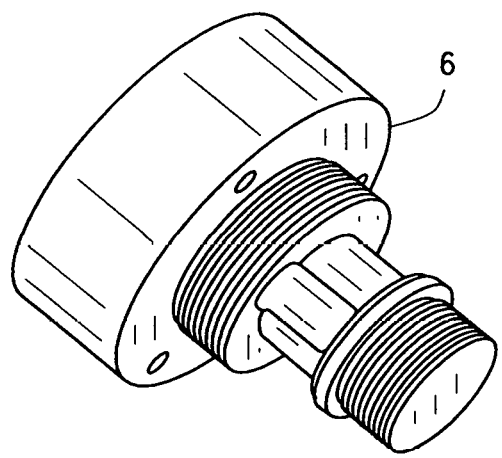
FIG. 11 is an isometric view of the adaptor for mounting the inner and outer tubes to the fuel tank of the fracking truck.
Figure 12:
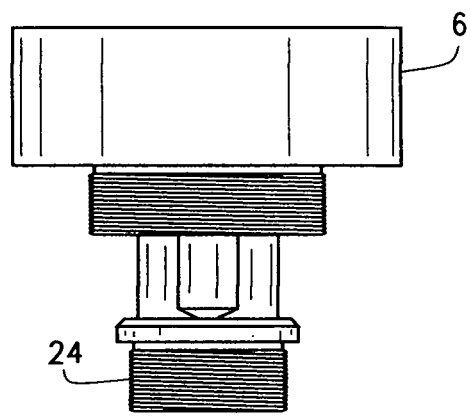
FIG. 12 is a side view thereof.

FIG. 4 provides a longitudinal view of the outer spout 3, and the various apertures 9 that are provided therethrough. FIG. 5 shows an end view of the spout 3. FIG. 6 is a sectional view of the spout, and it can be seen where one end may be internally threaded, as at 19, in order to secure with the adaptor 6, or its cap 4, as noted. Generally, the outer spout will have a channel, as at 20, extending entirely throughout its length.

The inner housing 2 can be seen in FIGS. 7 through 10. As noted, it also has its series of apertures 9, provided therein, but it does have various and large apertures, as shown at 9a, and which provide for greater exposure of the sensors 11, to the fuel passing through and located within the fuel tank, to provide for detection of the fuel levels present within the tank, at any stage of time, whether it be while the fuel tank is being replenished, or when a fueling operation has been either manually, or automatically, performed, through the usage of this sensor device. The inner housing 2 likewise has a series of threads, at one end, as noted at 21 and this provides for accommodating the threading of the housing 2 directly to the lower end of the adaptor, as noted at 22, as can be seen.

Figure 13:
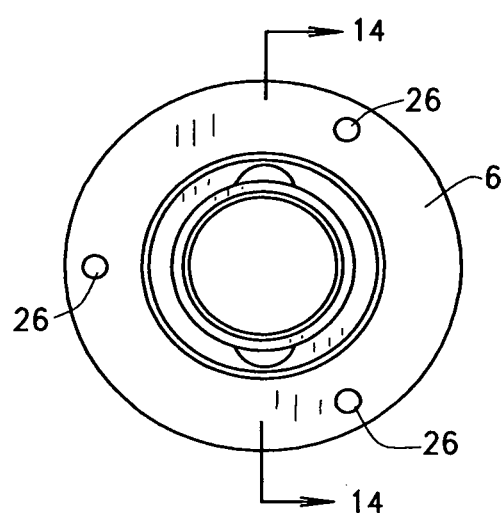
FIG. 13 is a lower end view of the adaptor.
Figure 14:
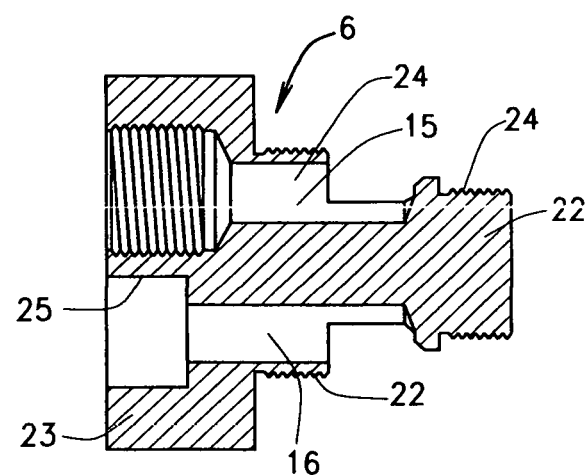
FIG. 14 is a longitudinal sectional view of the adaptor taken along the line 14-14 of FIG. 13.

The various formations of the adaptor 6 can be seen in FIGS. 11 through 14, and it can be seen that the adaptor has its upper enlarged segment 23 that gradually tapers down to its lower end 22 as noted in FIG. 14. This lower end 22 has its threads 24 which engage with the threads of the inner housing 2, as previously explained. At the midpoint of the adaptor 6 is the stepped location, as at 24, and which is also threaded, for connecting with the outer housing 3, when secured thereto. In addition, these threads likewise provide for a means for securement of the cap 4 to the adaptor, during its assembly. Also can be seen the previously defined flow path 15, that communicates with the swivel 7, previously defined, so as to allow for the flow of fuel through the adaptor, from a fuel line, and for its passage within the space between the inner housing 2 and the outer spout 3, as previously defined. This is generally that flow path 15, leading towards that space between the tubular members, as previously described. Furthermore, the opening 16 accommodates the locating of the electrical wires 17 as previously defined, through the same, for their connection with a receptacle 18, that fits within the opening 25 of the said adaptor.

As can be noted in FIG. 13, the adaptor 6 on its upper surface has a series of shallow bores 26 that accommodate the locating of a tool, useful for threadedly engaging the adaptor to its various other components, when its cap is secured onto the fuel inlet into the fuel tank of the fracking truck, when installed. A pin or screw, as noted at 27, is useful for securement of the cap 4, to the adaptor 6, when the entire assembly 34 is formed, in preparation for its installation onto the fuel inlet of the said fuel tank of the fracking truck.

While the sensor probe of this invention has been defined generally, and more specifically, for use in combination with the sensing of the level of fuel delivered, and to be delivered, to the fuel tank of a fracking truck, it is just as likely that this sensor probe can be used in almost any type of fuel tank, or any type of fluid reservoir, that needs to be continuously monitored for liquid level, and to instruct either an operator, or other monitoring device, when replenished liquid must be added to a liquid tank, during operations of the device to which this sensor is applied.

Variations and modifications to the subject matter of this invention may occur to those skilled in the art upon review of the development as described herein. Such variations, if within the spirit of this invention, are intended encompassed within the scope of any claims to patent protection issuing upon this improvement. Any reference to the invention as depicted in the drawings, and as explained in the specification, are provided generally for illustrative purposes only.

I claim:

1. A fracking sensor probe for detecting the level of fuel maintained in the fuel tank of a fracking truck, the fuel tank having a fuel inlet, comprising:
   a sensor probe provided for insertion into the fuel tank of a fracking truck, said sensor probe having an outer spout, said sensor probe having an inner housing, said inner housing extending through said outer spout and being concentrically arranged therein;
   a cap provided at the upper end of said outer spout and inner housing, said cap capable of being connected to the fuel inlet for the fuel tank;

an adapter securing to said cap, said outer spout securing to one of said adapter and cap, and said inner housing securing to said adapter;

there being a fuel flow path through said adapter, and said fuel flow path extending between said inner housing and outer spout;

at least one fuel sensor provided within said inner housing and provided for detecting the fuel level when the fuel sensor is at the level of fuel in the fuel tank;

an electric line connecting to said fuel sensor and said electric line provided through the said adapter for delivery of information remotely regarding the fuel level within the fuel tank of the fracking truck and initiating delivery of fuel to said fuel tank to replenish fuel supply to the fracking truck.

2. The fracking sensor probe of claim 1, wherein there are more than one fuel sensor being vertically aligned within the inner housing of said sensor probed.

3. The fracking sensor probe of claim 2, wherein there are three fuel sensors provided vertically arranged within the inner housing of the sensor probe.

4. The fracking sensor probe of claim 1, wherein a camlock is operatively associated with the probe cap to provide for locking of the sensor probe onto the fuel inlet of the fracking truck.

5. The fracking sensor probe of claim 4, wherein said inner housing and outer spout of the sensor probe having a series of apertures provided therethrough to allow for passage of fuel into the sensor probe during its usage.

6. The fracking sensor probe of claim 5, and including a series of electric wires connecting with each of the fuel sensors, and said wires extending through the said adapter for connecting with the electric line of any monitoring equipment.

7. The fracking sensor probe of claim 6, and including an electrical installation provided upon the outer surface of the said adapter, and said electrical installation connecting with the electrical lines connecting with the fuel sensors, and said electrical installation provided for connecting with the circuit lines from the monitoring equipment to provide for a determination of the level of fuel remaining in the fuel tank of the fracking truck, during its operation.

8. The fracking sensor probe of claim 7, wherein said monitoring equipment operatively associated with a fuel truck and capable of initiating the delivery of fuel into the fuel tank of the fracking truck, when additional fuel is needed, and for curtailing the delivery of fuel to the flocking truck, when its fuel tank is filled to capacity.

9. The fracking sensor probe of claim 8, and including a bushing provided within the inner housing and provided for securement of a fuel sensor thereto during usage of the fracking sensor probe.

10. The fracking sensor probe of claim 9, and including a swivel connecting with said adapter and provided for communicating with the fuel flow path through said adapter and for connecting with the fuel line of the fuel supply for delivery of fuel to the fuel tank of the said fracking truck during its functioning.

11. The fracking sensor probe of claim 10, wherein each fuel sensor is formed as a reed switch, for detecting fuel level within the fuel tank of the fracking truck.

12. The fracking sensor probe of claim 11, wherein said inner housing threadedly engages with the adapter.

13. The fracking sensor probe of claim 10, wherein said outer spout threadedly engages with one of the cap or adapter.

14. The fracking sensor probe of claim 2, wherein said fuel sensors have buoyancy, and are floatable upon the fuel in said inner housing.

15. The fracking sensor probe of claim 9, wherein said bushing limits the upper level of flotation of its associated fuel sensor during usage.

16. A sensor probe for detecting the level of fuel maintained in a fuel tank, the fuel tank having a fuel inlet, comprising:

a sensor probe provided for insertion within the fuel tank, said sensor probe having an outer spout, said sensor probe having an inner housing, said inner housing through said outer spout is concentrically arranged therein;

a cap provided at the upper end of said spout and inner housing, said cap capable of being connected to the fuel inlet for the fuel tank;

an adapter securing to said cap, said outer spout securing to one of said adapter and cap, and said inner housing securing to said adapter;

there being a fuel flow path through said adapter, and said fuel flow path extending between said inner housing and outer spout;

at least one fuel sensor provided within said inner housing and provided for detecting the fuel level when the fuel sensor is at the level of the fuel in the fuel tank;

an electric line connecting to said fuel sensor and said electric line provided through the said adapter for delivery of information remotely regarding the fuel level within the fuel tank and initiating delivery of fuel to the said fuel tank to replenish the fuel supply within said tank.

17. The fracking sensor probe of claim 16, wherein the inner housing extends below the outer spout of the sensor probe during its installation.

18. A sensor probe for detecting a level of fuel maintained in a fuel tank, the sensor probe comprising:

the sensor probe being configured for insertion into a fuel tank, the sensor probe having an outer spout that is tubular, the sensor probe having an inner housing that is tubular, the inner housing being positioned extending through the outer spout and being concentric with the outer spout;

a cap provided at one end of the outer spout and at one end of the inner housing, the cap being configured for connection to a fuel inlet of a fuel tank;

an adapter secured to the cap, the outer spout being secured to at least one of the adapter and the cap, and the inner housing being secured to the adapter;

at least one fuel sensor positioned in the inner housing, the at least one fuel sensor being operable to detect a fuel level when the fuel sensor is at the fuel level in the fuel tank;

an electric line connected to the fuel sensor, the electric line extending through the adapter and being operable to conduct fuel level information from the fuel sensor and through the adapter to a location remote from the sensor probe.

19. The sensor probe of claim 18, further comprising:

a fuel flow path extending through the adapter, the fuel flow path being positioned in the adapter between the outer spout and the inner housing.

20. The sensor probe of claim 19, further comprising:

the outer spout surrounding and being spaced outwardly from the inner housing.

* * * * *